United States Patent [19]

Talke et al.

[11] 4,011,923
[45] Mar. 15, 1977

[54] MOBILE SEISMIC ENERGY SOURCE

[75] Inventors: Herbert Talke, Laatzen; Gerhard Müller, Sehnde; Jürgen Schmidt, Bolsehle, all of Germany

[73] Assignee: Prakla-Seismos GmbH, Hannover, Germany

[22] Filed: Sept. 9, 1975

[21] Appl. No.: 611,672

[30] Foreign Application Priority Data

Mar. 6, 1975 Germany ............................ 2509704

[52] U.S. Cl. .............................. 181/114; 181/119
[51] Int. Cl.² .................................... G01V 1/04
[58] Field of Search ................. 181/114, 119, 121; 254/86 R

[56] References Cited
UNITED STATES PATENTS

| | | |
|---|---|---|
| 3,024,861 | 3/1962 | Clynch .......................... 181/114 |
| 3,295,630 | 1/1967 | Kilmer .......................... 181/114 |
| 3,658,148 | 4/1972 | Clynch .......................... 181/114 |
| 3,690,402 | 9/1972 | Stafford ........................ 181/114 |
| 3,779,335 | 12/1973 | Chelminski ................... 181/114 |
| 3,929,206 | 12/1975 | Bedenbender et al. ...... 181/114 |

*Primary Examiner*—Howard A. Birmiel

[57] ABSTRACT

A mobile seismic energy source is formed by an automotive vehicle equipped with a vibrator type seismic energy source, a lifting mechanism, means for generating fluid pressure, and control means. Frame means pivotably linked to the vehicle chassis are provided for supporting the vibrator which is lowered into operational position and raised therefrom by the lifting mechanism acting between the vehicle chassis and linking arms of the frame means.

10 Claims, 7 Drawing Figures

MOBILE SEISMIC ENERGY SOURCE

BACKGROUND OF THE INVENTION

In modern seismic exploration, it has become common practice to employ a vibrator transducer to impart to the ground an oscillatory sweep-signal of predetermined characteristics. Generally the vibrator transducer includes a base plate in contact with the ground, a reaction mass having a weight of a ton or more, and a linear actuator designed to move the reaction mass reciprocatingly relative to the base plate in short vertical strokes. Working against the reaction mass, the base plate injects the desired vibrations into the ground.

For transporation from place to place, the vibrator is mounted on a vehicle in that way that it can be lowered by means of a lifting mechanism until the base plate is brought in contact with the ground, and thereafter lifted again to an elevated position for transport action.

Generally the vibrator is a two-masses-system which may be excited to oscillations, for instance by means of hydraulic pressure. One of these two masses is formed by the base plate together with the ground coupled thereto by contact. This mass is in connection with the reaction mass of the vibrator which forms the second mass of the system, by hydraulic means which are controllable by a combination of electric and hydraulic control means. These control means receive an electric signal from a registration station which is transformed into a seismic signal through mechanical oscillatory motion generated by the vibrator and emitted into the earth by the base plate.

Operations consist of a series of cycles carried out in a very short time each cycle going over a few seconds only. During one cycle a seismic signal will be emitted and received again for instance by geophones, the vibrator will be lifted, the carrier or vehicle moved to a new place, and the vibrator lowered into operational position at that new place.

Lifting devices of conventional design show several drawbacks which may lead to difficulties when seismic explorations are carried out.

Conventional lifting devices comprise two or four hydraulic jacks which are symmetrically mounted at both sides of the carrier vehicle. The lifting units are expressive and delicate devices and their strokes or lifting and lowering motions must be in precise synchronization for realizing the predetermined cycle. In spite of additional installations for ensuring the desired synchronization, damages cannot be avoided which are caused by tilting of the pistons in the hydraulic cylinder; this might be due to pressure variations, reaction forces etc, and cannot be reliably excluded in conventional system.

A further rather important drawback of conventional systems is that the delicate lifting units are mounted on the upside of the base plate and adjacent to its side edges. Mounting of the lifting jacks next to the vibrator is complicated also in this respect that access to the vibrator mass and associated parts will be difficult. This makes servicing a difficult and time consuming job.

SUMMARY AND OBJECTS OF THE INVENTION

The invention is concerned with providing special means for ensuring troublefree and lowwear operation of a mobile vibrator type seismic energy source. For that purpose a vehicle according to the invention and comprising a vibrator, a source of fluid pressure, a control unit and lifting means, is provided with special frame means for supporting the vibrator. That frame means includes arms for pivotably connecting the vibrator with the chassis of the vehicle, the lifting means operating between the chassis and the arms and are linked to the latter at an intermediate spaced from both arm ends.

In a preferred embodiment a sole lifting jack is used as lifting means said jack being mounted symmetrical to the arms, and spring means being provided between the base plate and that part of the vehicular mass which is supported during operation of the lifting jack on the base plate. Such spring means is mounted preferably between the lower end of the jack and the base plate, any may be used as an indicator for controlling the lifting motion by which after lowering of the base plate, one end of the vehicle is lifted for placing additional load on the base plate.

Therefore it is a primary object of the invention to provide a mobile vibrator type seismic energy source in which the lifting mechanism is not any longer used as a guiding means for the vibrator mass, but is mounted separately and therefore is better protected against damages.

It is a further object of the invention to provide a vehicle having a vibrator which can be lowered and raised again, with special frame means for better control of the vibrator lowering motion.

According to a still further object a mobile seismic energy source of the mentioned kind is provided with improved control means for swifter and smoother operation.

It is also an object of the invention to provide a mobile seismic energy source with means for controlling the lifting operation in dependence of the pressure with which the vibrator base plate is pressed against ground.

It is a general object of the invention to provide a mobile vibrator type seismic energy source in which the above mentioned drawbacks of conventional apparatuses are diminished or even obviated.

Further objects and advantages may be derived from the following detailed description.

DETAILED DESCRIPTION OF THE INVENTION

Figure 1:
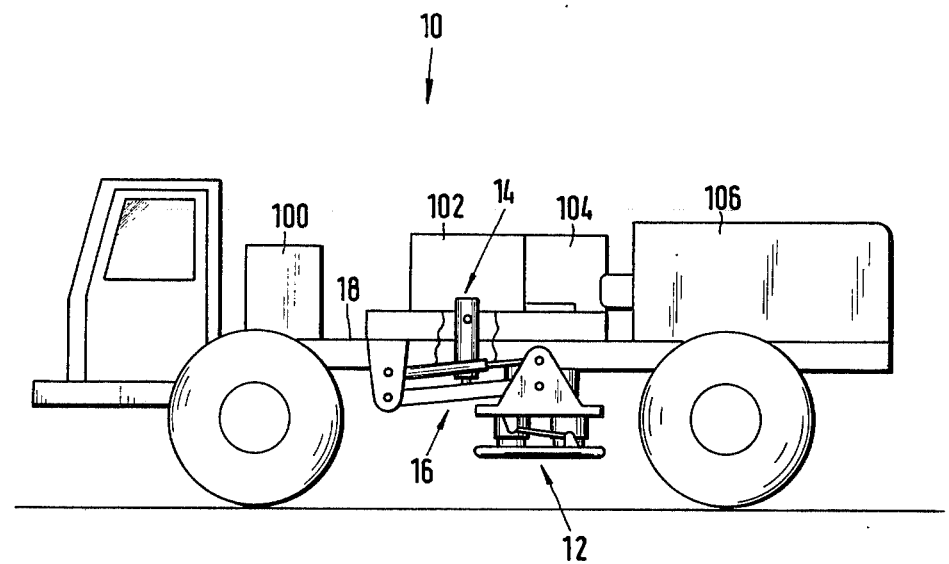
FIG. 1 shows an elevational side view, in a simplified manner and with parts broken away, of a vehicle according to the invention in condition for driving.
Figure 2:
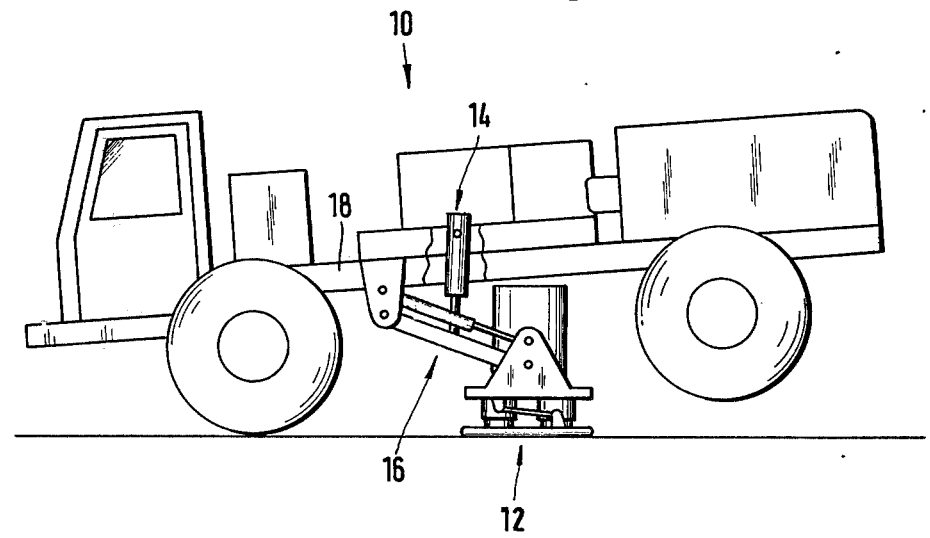
FIG. 2 is a view similar to that one of FIG. 1 but showing the vehicle in a state for seismic operatious.

A vehicle according to the invention which is shown in FIGS. 1 and 2 in a simplified manner, is generally indicated as 10. Vehicle 10 is provided with a chassis 18 on which a prime mover 106, a source of hydraulic pressure 104 and a source of pneumatic pressure 102 are mounted. Besides, chassis 18 carries a vibrator type seismic energy source generally indicated as 12, and an hydraulic lifting device generally indicated as 14. Vibrator 12 is mounted in frame means 16 by which vibrator 12 is pivotably connected to chassis 18. Lifting device 14 comprises a double acting hydraulic piston cylinder unit to be described in more detail below. Chassis 18 also carries a control unit 100 for controlling hydraulic and pneumatic means in the inventive system, the connecting conduits being omitted for clearer representation.

FIG. 1 shows the vehicle 10 in that condition in which vibrator 12 is kept in its elevated state by means of lifting device 14 and pivotable frame 16, and in which it can travel from one point of operation to the next.

In FIG. 2, vehicle 10 is in the state for operation as a seismic source. Vibrator 12 is lowered to the ground and may impart oscillatory signals thereto. The state shown in FIG. 2 is reached by suitable actuation of lifting device 14 by which frame 16 is swung downward, thereby bringing vibrator 12 into ground contact.

By further feeding of hydraulic pressure to device 14 the rear part of the vehicle is lifted from the ground. A part of the weight of the vehicle is then supported by the base plate of the vibrator. In that way coupling between the vibrator and the ground is improved. Besides by putting a part of the vehicle weight on the base plate, the vibrator will not be separated from the ground under the influence of acceleration forces when emitting a seismic signal.

Figure 3:
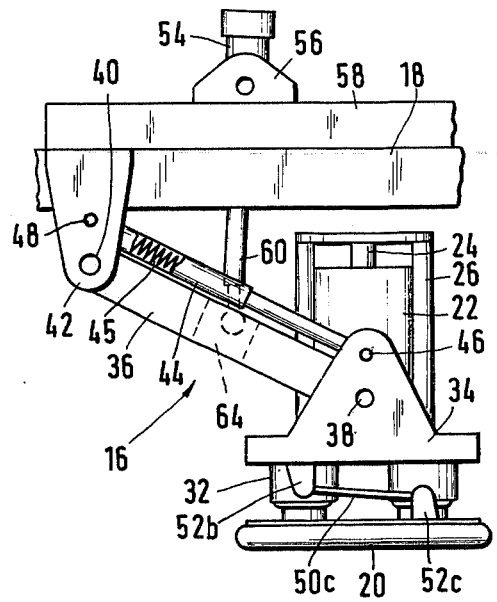
FIG. 3 shows an elevational side view of a lifting device and of the vibrator proper used in a vehicle according to FIG. 1, in a state for generating seismis vibrations.
Figure 4:
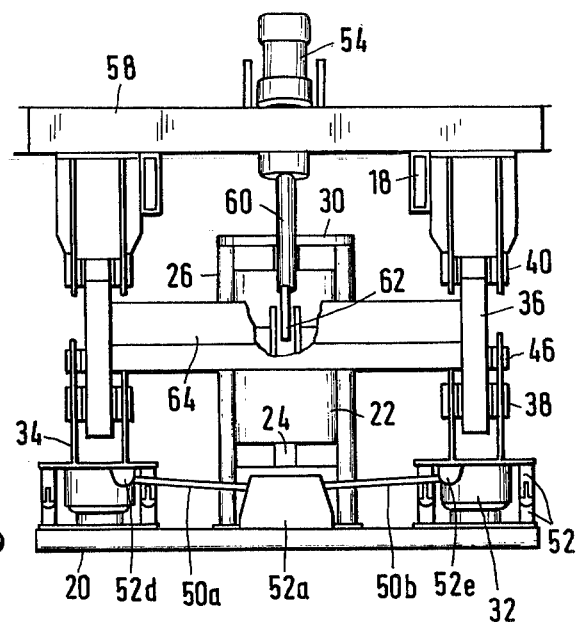
FIG. 4 is an elevational end view of the details shown in FIG. 3.

FIGS. 3 and 4 show in more detail, and in a larger scale, the essential parts of a vehicle 10 according to the invention.

Vibrators for seismic purposes are generally known, see for instance U.S. Pat. No. 3,811,530 (Johnston), and vibrator 12 is described here only as far as the structure differs from known types.

Vibrator 12 is provided with a base plate 20 which when lowered into coupling contact with the ground, forms together therewith one of the two masses of a vibratory system. A second or reaction mass 22 is hydraulically coupled to the base plate. Mass 22 is a substantially cylindrical steel block in a central bore of which a double acting piston cylinder unit is mounted of which piston rod 24 is shown only, rod 24 being connected with the base plate 20 for coupling purpose. Reaction mass 22 is mounted between guiding rods 26 which interconnect base plate 20 and a cover plate 30 with which also the opposite or upper end of piston rod 24 is connected.

On both sides of the vehicle, brackets 34 are supported on base plate 20 by means of spring elements 32 which may be pneumatic bellows elements or pneumatic springs. With each bracket 34 an arm 36 is pivotably connected by a journal 38 at the lower end of the arm. The upper end of arm 36 is connected with a bracket 42 by means of journal 40, bracket 42 being rigidly secured to chassis 18. Under operational conditions according to FIG. 2, spring means 32 prevent vibrations from being transferred from the baseplate to the vehicle, or that the vehicle takes part in the vibrations of the base plate. A self adjusting arm 44 is mounted in parallel to each one of the arms 36. Each arm 44 is pivotably connected at opposite ends by journals 46, or 48, respectively, with brackets 34, or 42, respectively. The self adjusting feature of arms 44 may be realized in that way that each arm consists of two parts telescopicly engaging each other so that the distance between journals 46 and 48 is self adjustingly changed according to the pivotal position of arm 36 in relation to bracket 42 and/or bracket 34. Preferably self adjusting arm 44 is provided with damping means 45 which is illustrated in the drawings in a simplified manner as a helical spring. However, damping means 45 may be a dashpotlike structure.

According to the invention stabilizing rods 50a, 50b and 50c are provided between base plate 20 and brackets 34, i.e. those parts which are in rigid connection with the upper ends of spring elements 32. Stabilizing rod 50c is pivotably connected at both ends with lugs 52b and 52c, respectively, of which lug 52b is rigidly secured to the bottom of bracket 34, and lug 52c to the upper side of base plate 20. In a similar way rods 50a and 50b extend between lug 52a which in turn is rigidly secured to the base plate, and lugs 52d, or 52e, respectively, which are in rigid connection with brackets 34. Each one of the rods 50a, 50b and 50c is slightly inclined in relation to a plane extending in parallel to base plate 20. The inclination of the stabilizing rods is chosen according to the axial extension of spring elements 32 under changing forces. Springs 32 comprise each two hollow cylindrical parts having different diameters and connnected at their open ends by an annular rollable diaphragm. The springs 32 are given such length that the vibration amplitude of base plate 20 will not be transferred to brackets 34. Stabilizing rods 50a, 50b, 50c prevent base plate 20 from tilting in relation to brackets 34. Besides, rods 50a, 50b, 50c are safeguarding spring elements 32 against damages by impact loads acting in a horizontal direction on base plate 20. This effect may be further enhanced by providing resilient sleeves made of rubber or a resilient plastics material for the journals of these rods.

Lifting device 14 comprises a hydraulic pistoncylinder unit the cylinder 54 of which is journaled in a bearing structure 56. In this example, bearing structure 56 consists of two brackets spaced apart for mounting cylinder 54 therebetween, and fixedly secured to a traverse or frame portion 58 which may be an integral part of chassis 18, or fixedly secured thereto. Piston rod 60 of the hydraulic piston cylinder unit is pivotably connected at its free or outer end and by means of journal joint 62, with a traverse beam 64 rigidly interconnecting arms 36 of both sides of frame 16. This articulated connection has the advantage that a pivotal motion of frame structure 16 may be carried out sefely and reliably without any bending stress acting on lifting device 14.

As a lifting device like that one provided for an apparatus according to the invention, is rather susceptible to damages improved protection of such device is provided for by its separation from the vibrator, and by having journals at both ends. Then, damages are avoided even when the base plate is hitting against ground during driving vehicle 10 from one site of operation to the next one crosscountry or over a rugged surface.

Figure 5:
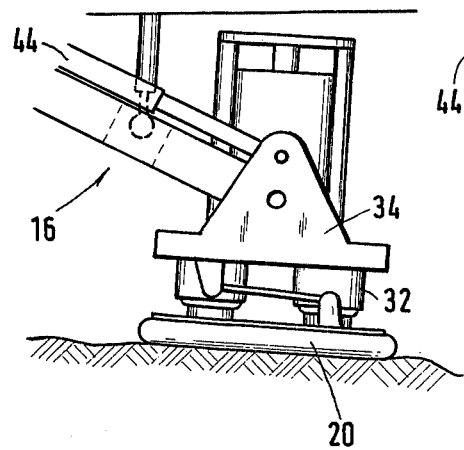
FIGS. 5 and 6 are views similar to that one of FIG. 3, illustrating operational conditions on inclined surfaces.
Figure 6:
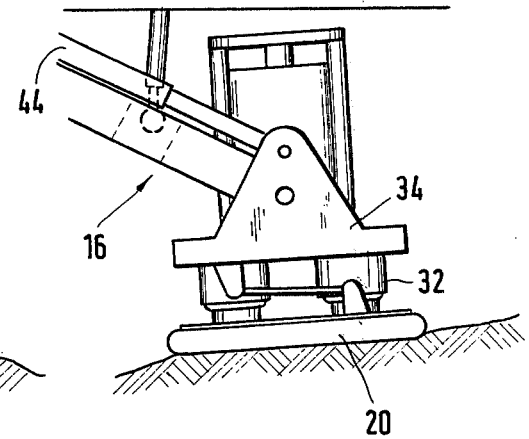

FIGS. 5 and 6 illustrate the operational advantages which are achieved by providing a pivotal connection between base plate 20 and frame structure 16. Base plate 20 of the vibrator may be put also onto an uneven ground surface so that a good coupling between base plate and ground surface is realized. A tilting movement of the vibrator is made possible by means of adjusting arms 44 which for instance are extended in the position of FIG. 5, and shortened in that one of FIG. 6. When being put down and tilted, base plate 20 keeps its position in relation to brackets 34. Also under these conditions a transfer of vibrations from base plate 20 to the frame structure 16 and the other parts of the vehicle is reliably prevented. One of the reasons of this effect is that the stiffness of spring elements 32 is greater than that one of the adjusting arms 44.

FIGS. 5 and 6 show, that base plate 20 of the inventive system may be applied also to ground surfaces which are inclined in the direction of the longitudinal axis of the vehicle. For adaptation of base plate 20 to surfaces which are inclined at right angles to the longitudinal axis of the vehicle, additional means may be provided.

For instance, that axis of the vehicle which during seismic operations is kept with its wheels in ground contact may be connected to the chassis 18 by journal and bearing means which allow for a tilting motion of chassis 18 in relation to that axle, and in transverse direction.

Figure 7:
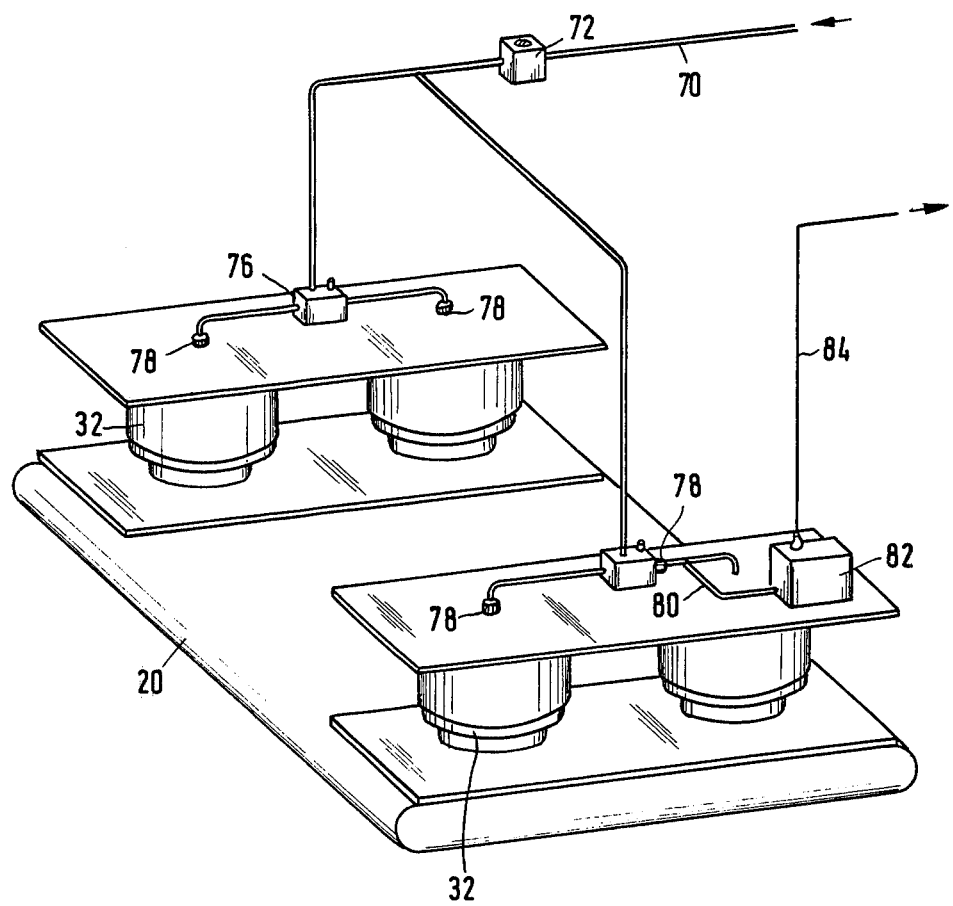
FIG. 7 is a simplified projective view of a part of a control system to be used in connection with a lifting device in a vehicle according to the invention.

FIG. 7 shows essential parts of a control system to be used in connection with an automatic control of the lifting device 14. As illustrated by this Figure, pneumatic springs 32 are mounted on the upper surface of base plate 20 in that way that along each one of two parallel edges an assembly of a pair of springs 32 between a head plate 33a and a foot plate 33b is provided, plate 33a being fixedly secured by conventional means to the bottom side of bracket 34, and plate 33b to the upper surface of the base plate.

As mentioned above, each spring 32 is formed by a bellows element. Compressed air is supplied to the interior space of each spring 32 from source 102 via conduit 70 comprising a pressure limiting valve 72. Valve 72 may be of conventional design and functions in that way that at its outlet a constant pressure is provided the level of which is reduced in comparison to the pressure supplied from source 102.

Downstreams of valve 72, conduit 70 branches into connecting conduits leading to the individual springs 32. For this purpose, branch fittings 76 are provided, the connections to the springs going through check valves 78 of conventional design.

Pressure limiting valve 72 is adapted to maintain the downstream pressure on a constant level, and therefore, will automatically make up any pressure loss in the downstream part of the system. Between one of the check valves 78 and the associated spring 32 a sensing conduit 80 branches off the supply line for direct communication of the spring bellows with a pressure operated switching device 82 which is connected with control unit 100 by electric conduit 84.

Normally, spring elements 32 will be filled with pneumatic pressure of a constant level when base plate 20 is in its elevated or lifted position, and when the vehicle weight is not applied thereto. When base plate 20 is lowered into ground contact, and thereafter by partly lifting the vehicle, a part of the vehicle weight is put upon plate 20, pressure inside of pneumatic springs 32 is increased.

Pressure operated switching device 82 is adjusted for operation when the pressure created by the increasing weight which is put upon the base plate during the lifting operation of the vehicle, reaches a predetermined limit. Then the switching device supplies a signal to electric conduit 84, and thereby to the control unit 100, and the control unit 100 will then switch off operation of the lifting device 14 in the lowering cycle.

Pressure operated switching device 82 may be provided with a delaying member which is adjustable to a predetermined delay time after which the switching operation is carried out, when a pressure signal is supplied thereto. This ensures that the wheels of the vehicle to be lifted by operation of the lifting device will be without ground contact when the lifting device is automatically shut off. The time delay means in the switching device may be replaced by a time delay means incorporated in the control unit 100.

By means of the automatically controlled system for switching off the lifting device an unnecessary, and with regard to the very short operational cycle, time consuming over-lifting is avoided, and besides, this feature ensures that independently of the contour of the ground surface, a predetermined part of the vehicle weight is supported through springs 32 on base plate 20.

According to the invention the part of the vehicle to be lifted out of contact with the ground will be moved upward to a very little extent only. In that way the wear and tear of the vehicle connected with conventional operation will be considerably diminished because the axle will be moved down afterwards for getting again full ground support, from lesser height than in conventional systems, and blows and undesirable oscillations of the chassis will also be diminished.

Automatic control of the lifting device in its elevating stroke has the further advantage that the centre of gravity of the lifted vehicle is kept as deep as possible. This adds considerably to the general stability of the vehicle with regard to tilting forces, the stability being also improved by the good coupling characteristics of the base plate and the special mounting of the vibrator according to the invention.

We claim:

1. A vehicular system for imparting seismic energy to a ground surface, the system defining a vehicular mass and comprising:

A. A vehicle chassis for supporting front and rear axles;

B. A vibrator type seismic energy source having a base plate for imparting seismic energy to the ground surface;

C. An under-chassis frame pivotally mounted to said chassis intermediate said axles for supporting said energy source under said chassis and intermediate said axles, the frame including at least one arm and a corresponding bracket, the arm having first and second ends pivotally connected to the chassis and to the bracket respectively, wherein the bracket is supportably coupled to the energy source and provides therefor a pivot point with said second end; and D. A lifting mechanism adjustably extending under said chassis, including only a single, fluid operated jack having one end pivotally connected to the chassis and another end pivotally coupled to the one arm intermediate the bracket and the chassis, for advancing the frame to positions relatively away-from and adjacent-to the chassis to thereby advance the base plate into and out of ground engagement respectively, whereby pressure from at least part of said vehicular mass is transferred to said base plate when the frame is in said away-from position.

2. A vehicle according to claim 1 in which at least one pair of stabilizing members is provided between said base plate and said bracket means, said stabilizing members being symmetrically mounted and having each two opposite ends one of which is pivotably connected with said base plate, and the other one with said bracket means, said members being inclined in that way that one of said ends of each member is above, and the other one below a plane which is parallel to the base plate.

3. A vehicle according to claim 2 wherein two pairs of stabilizing members are provided, the members of one pair being directed at right angles to that one of the other pair.

4. The vehicular system according to claim 1 wherein there are two said arms symmetrically mounted in spaced relation and extending in longitudinal direction of the chassis, and wherein said lifting mechanism is mounted substantially in the middle between said two arms.

5. The vehicular system according to claim 4 and including a support member coupled between the arms for pivotally receiving said another end of the jack.

6. A vehicle according to claim 1 wherein said frame further comprises pneumatic spring mean mounted between said base plate and said bracket, and said system further comprises:
   A. Means for maintaining the pressure in said pneumatic spring means at a first predetermined level when said base plate is adjacent the chassis; and
   B. Pressure sensing means coupled to the pneumatic spring means for controlling operation of the lifting mechanism during advancing of the base plate into ground engagement, whereby the advancing of the base plate is terminated when the pressure of the pneumatic spring means exceeds a second, predetermined level.

7. A vehicular system for imparting seismic energy to a ground surface, the system defining a vehicular mass and comprising:
   A. A chassis;
   B. A vibrator type seismic energy source having a base plate for use on a ground surface in combination with a part of said vehicular mass as a static load;
   C. Lifting means for lowering said base plate from an elevated, inactive position into contact with said ground surface and for supporting said part of the vehicular mass on said lowered base plate, by lifting one end of said chassis, and for retracting said lowered base plate into said elevated, inactive position; and
   D. Frame means on which said seismic energy source is mounted and which comprises two arms symmetrically mounted in spaced relation and each extending in longitudinal direction of said chassis, each of the arms having opposite ends respectively pivotally connected to said chassis and to bracket means which are in supporting connection with said seismic energy source, each of said arms being provided with a self-adjusting arm mounted in parallel spaced relation; wherein
   E. Said lifting means has opposite ends, one of the ends being pivotally connected to said chassis and the other of the ends being pivotally connected to the arms at points spaced from the ends of the arms.

8. The vehicle according to claim 7 wherein each of the self-adjusting arms is provided with damping means for damped self-adjustment.

9. A vehicular system for imparting seismic energy to a ground surface, the system defining a vehicular mass and comprising:
   A. A vehicle chassis;
   B. A vibrator type seismic energy source having a base plate for imparting seismic energy to the ground surface;
   C. A frame for supporting said energy, the frame including at least one support arm, one self-adjusting arm, and one corresponding bracket, the bracket being coupled to support the energy source, and the self-adjusting arm being mounted between said chassis and said bracket in spaced parallel relation with said one support arm, the support arm having first and second ends respectively pivotally connected to the chassis and to the bracket; and
   D. A lifting mechanism coupled between the chassis and said one arm for advancing the base plate into and out of ground engagement.

10. A vehicular system for imparting seismic energy to a ground surface, the system defining a vehicular mass and comprising:
    A. A vehicle chassis for supporting front and rear axles;
    B. A vibrator type seismic energy source having a base plate for imparting seismic energy to the ground surface;
    C. An under-chassis frame pivotally mounted to said chassis intermediate said axles for supporting said energy source under said chassis and intermediate said axles, the frame including at least one arm and corresponding bracket, the arms having first and second ends pivotally connected to the chassis and to the bracket respectively, wherein the bracket is supportably coupled to the energy source and provides therefor a pivot point with said second end;
    D. A lifting mechanism adjustably extending under said chassis, including only a single, fluid operated jack having one end pivotally connected to the chassis and another end pivotally coupled to the one arm intermediate the bracket and the chassis, for advancing the frame to positions relatively away-from and adjacent-to the chassis to thereby advance the base plate into and out of ground engagement respectively, whereby pressure from at least part of the vehicular mass is transferred to the base plate when the frame is in said away-from position;
    E. Pressure controlled spring means coupling the bracket and the base plate;
    F. Control means for maintaining the pressure of the spring means at a first predetermined level when said base plate is out of ground engagement; and
    G. Pressure actuated switch means coupled to the spring means and actuated responsive to the pressure of the spring means reaching a second predetermined level during advancing of the base plate into ground engagement for deactuating said lifting mechanism and thereby stopping further advancing of the base plate.

* * * * *